May 20, 1924.
J. F. MAKOWSKI
WALL CONSTRUCTION AND METHOD OF MAKING SAME
Filed May 28, 1923
1,494,926
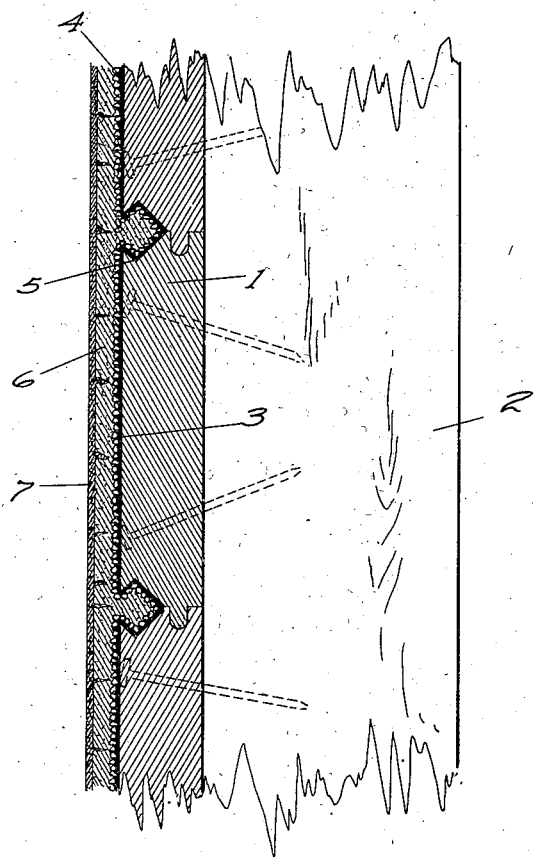
INVENTOR.
John F. Makowski
BY
ATTORNEY Patented May 20, 1924.

1,494,926

UNITED STATES PATENT OFFICE.

JOHN F. MAKOWSKI, OF STOCKTON, CALIFORNIA, ASSIGNOR TO CALIFORNIA CEDAR PRODUCTS COMPANY, A CORPORATION.

WALL CONSTRUCTION AND METHOD OF MAKING SAME.

Application filed May 28, 1923. Serial No. 641,964.

*To all whom it may concern:*

Be it known that I, JOHN F. MAKOWSKI, a citizen of the United States, residing at Stockton, county of San Joaquin, State of California, have invented certain new and useful Improvements in Wall Constructions and Methods of Making Same; and I do declare the following to be a full, clear, and exact description of the same, reference being had to the accompanying drawings, and to the characters of reference marked thereon, which form a part of this application.

This invention relates to the building art and particularly to wall construction.

The object of the invention is to produce a wall structure for plastic surfacing or stucco finish consisting of Portland cement or the like which can be made up very cheaply and be strong, water proof and fire resisting, and in which the checks or cracks due to the natural shrinkage of the elements of the wall itself will not be visible.

Under known methods, prior to my invention, cement stucco walls are very difficult to make water proof, and no method of successfully covering the checks or cracks is in use. Dashing or floating the first coat with Portland cement has proved a failure since it does not successfully cover or fill the original checks or cracks but develops new ones itself.

I accomplish the objects of the invention by the erection of a composite wall structure, the elements of which are particularly selected to have a natural bonding affinity for each other, whereby a very thin, inexpensive, but strong and water proof wall will result and a minimum of checking and cracking will occur. Then I completely cover all checks and cracks with a waterproof non-shrinking adhesive element, all as will appear in the following description and claims.

The figure of the drawings is a vertical section through a portion of my improved wall structure.

In constructing the wall I first use a base of plaster laths 1 constructed as shown in my pending application for patent, Serial No. 642,498, filed May 31, 1923.

These laths are nailed to the uprights 2 in edge to edge relation. The numeral 3 designates the magnesite binder and 4 the small gravel or other mechanical key structure formed or provided on the lath in its making.

In forming the wall the Portland cement 6 is spread over the mechanical key structure 3 and into the dovetailed grooves 5. Due to the fact that the gravel is a natural bond for said cement it is only necessary that a very thin coat of the cement be spread thereon to make a good wall and one which will set up in first class shape. The fact that this natural bond and mechanical key structure is spread over the entire surface of the structure and offers so many crevices and interstices for the cement to flow into, causes the wall thus constructed to become a composite surface of closely bonded elements with which there is no chance of the cement coating falling off, sagging or cracking to any marked degree. However, certain checks and small cracks will appear, due to the natural shrinkage of the material itself. In constructiong the wall I therefore wait, after applying the cement coating, until there has been plenty of time for the same to set and dry thoroughly so that all possible checks and cracks will have materialized. This period of waiting varies of course with climatic conditions, quantity and quality of the cement or other material used, etc., but in no event should exceed thirty days. After this period has passed, I dash or otherwise spread or flow onto the outer surface of the wall, a coating of non-shrinking, water proof adhesive cement 7, preferably magnesite mixed with an eighteen to twenty-two per cent solution of chloride of magnesium and a suitable filler of diatomaceous earth such as silicate or the like.

I am aware that it has been tried, in the past, to cover the checks and cracks with an outer coat of ordinary Portland cement but this has not proved satisfactory since that cement is not in itself a non-shrinking element, and when applied it either commences to check itself or shrink in conformity to the checks and cracks of the wall proper. My composition, however, being inherently a non-shrinking element, it flows into and permanently fills the checks and cracks in the wall.

Having thus described my invention what I claim as new and useful and desire to secure by Letters Patent is:

1. A wall consisting of a supporting surface, a coating of Portland cement bonded thereto, and a coating of non-shrinking adhesive cement over the face of the Portland cement.

2. A composite wall structure comprising a supporting surface, a mechanical key bonded to the support, a plastic material bonded to the key, and a coating of non-shrinking adhesive cement over the face of the plastic material.

3. A composite wall consisting of a supporting surface, a water proofing adhesive, small gravel, Portland cement, and a non-shrinking adhesive cement, bonded together in the order named.

4. A composite wall consisting of a supporting surface, an adhesive, a mechanical key structure, Portland cement and a non-shrinking adhesive cement, bonded together in the order named.

5. A composite wall consisting of a supporting surface, an adhesive, a mechanical key structure, Portland cement, and a composition consisting of magnesite, magnesium chloride and a filler, all bonded together in the order named.

6. The method of constructing a wall of the type described consisting in applying Portland cement to the wall surface, allowing the cement to set a desired length of time to develop checks and cracks and then applying a non-shrinking adhesive cement to the exposed surface of the Portland cement.

7. A wall consisting of a supporting surface, a coating of Portland cement bonded thereon, and a coating of a cement of different character from the Portland cement covering the outer face of the latter.

8. A wall consisting of a supporting surface, a coating of a plastic material thereon, and a coating of a non-shrinking cement over the outer face of said plastic material.

9. A wall consisting of a supporting surface, a coating of a plastic material thereon, and a coating of a non-shrinking cement over the outer face of said plastic material, the ingredients of the two coatings having a bonding affinity for each other.

In testimony whereof I affix my signature.

JOHN F. MAKOWSKI.